United States Patent
Barnes, III

(10) Patent No.: US 6,592,076 B1
(45) Date of Patent: Jul. 15, 2003

(54) COLLAPSIBLE AIRSHIP BATTEN ASSEMBLY

(76) Inventor: Alfred C. Barnes, III, 191 Avenida Elena, San Marcos, CA (US) 92069

( * ) Notice: Subject to any disclaimer, the term of this patent is extended or adjusted under 35 U.S.C. 154(b) by 0 days.

(21) Appl. No.: 09/954,913

(22) Filed: Sep. 18, 2001

Related U.S. Application Data

(60) Provisional application No. 60/254,865, filed on Dec. 11, 2000.

(51) Int. Cl.[7] ................................................. B64B 1/58
(52) U.S. Cl. ......................... 244/125; 244/115; 244/30
(58) Field of Search ........................... 244/30, 31, 125, 244/126, 130, 127, 115

(56) References Cited

U.S. PATENT DOCUMENTS

| | | |
|---|---|---|
| 1,007,405 A | 10/1911 | Wagner et al. |
| 1,128,934 A | 2/1915 | Belanski |
| 1,314,899 A | 9/1919 | Pinter |
| 1,505,135 A | 8/1924 | Durr |
| 1,544,190 A * | 6/1925 | Smith .......................... 244/25 |
| 1,656,137 A * | 1/1928 | Bradford .................... 244/125 |
| 3,116,037 A * | 12/1963 | Yost ............................ 244/31 |
| 4,012,016 A | 3/1977 | Davenport |
| 4,280,674 A | 7/1981 | Crosby |
| 4,762,295 A * | 8/1988 | Yon, Jr. ...................... 244/115 |
| 5,285,986 A * | 2/1994 | Hagenlocher .............. 244/125 |
| 5,429,325 A * | 7/1995 | Hunt ........................... 244/115 |
| 5,865,201 A * | 2/1999 | Lin ............................. 135/25.2 |
| 5,975,099 A * | 11/1999 | Johnson et al. ............. 135/29 |

* cited by examiner

Primary Examiner—Peter M. Poon
Assistant Examiner—Timothy D. Collins

(57) ABSTRACT

A collapsible airship batten assembly (20) is disclosed for airships (22). The assembly (20) is deployed upon inflation of the containment chamber, and is freely collapsible during the deflation process. The preferred embodiment includes the folding nose batten assembly (20), comprising a central deployment guide beam (50), a spoke hinge hub (56) rigidly affixed to the aft end of the central beam (50), a set of spokes (58), the first ends of which are adjustably connected to and emanating out from the spoke hinge hub (56), a nose spar hinge hub (46) slidably mounted on the central beam (50) for movement along the length of the beam (50), a set of nose spars (42), the first ends of which are attached to the exterior of the airship skin (36) and adjustably connected to the seconds ends of the spokes (58), and the second ends of the nose spars (42) translate inwardly to movably connect with the nose spar hinge hub (46). The fore and aft movement of the nose spar hinge hub (46) facilitates the respective expansion and collapsing of the batten assembly (20). The preferred embodiment includes a set of battens (38) attachably connected to the first ends of the nose spars (42) and positioned adjacent the exterior of the envelope skin (36). The preferred embodiment also includes the set of battens (38) that are attached to the nose spars (42) by way of a flexible joint (40).

11 Claims, 3 Drawing Sheets

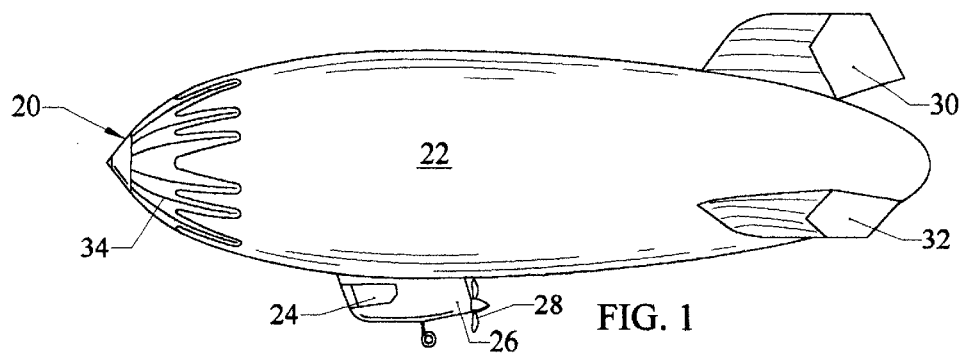
FIG. 1
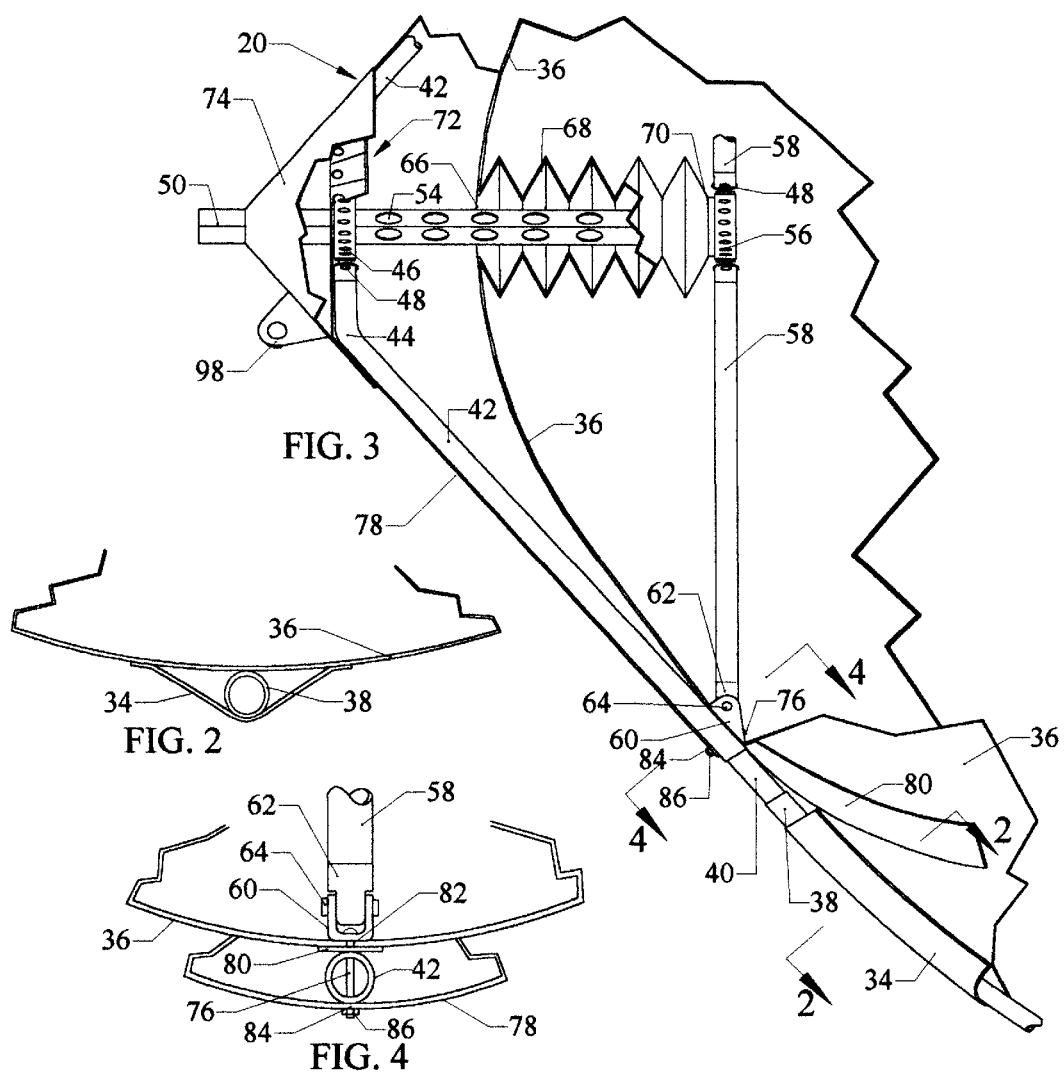
FIG. 2
FIG. 3
FIG. 4

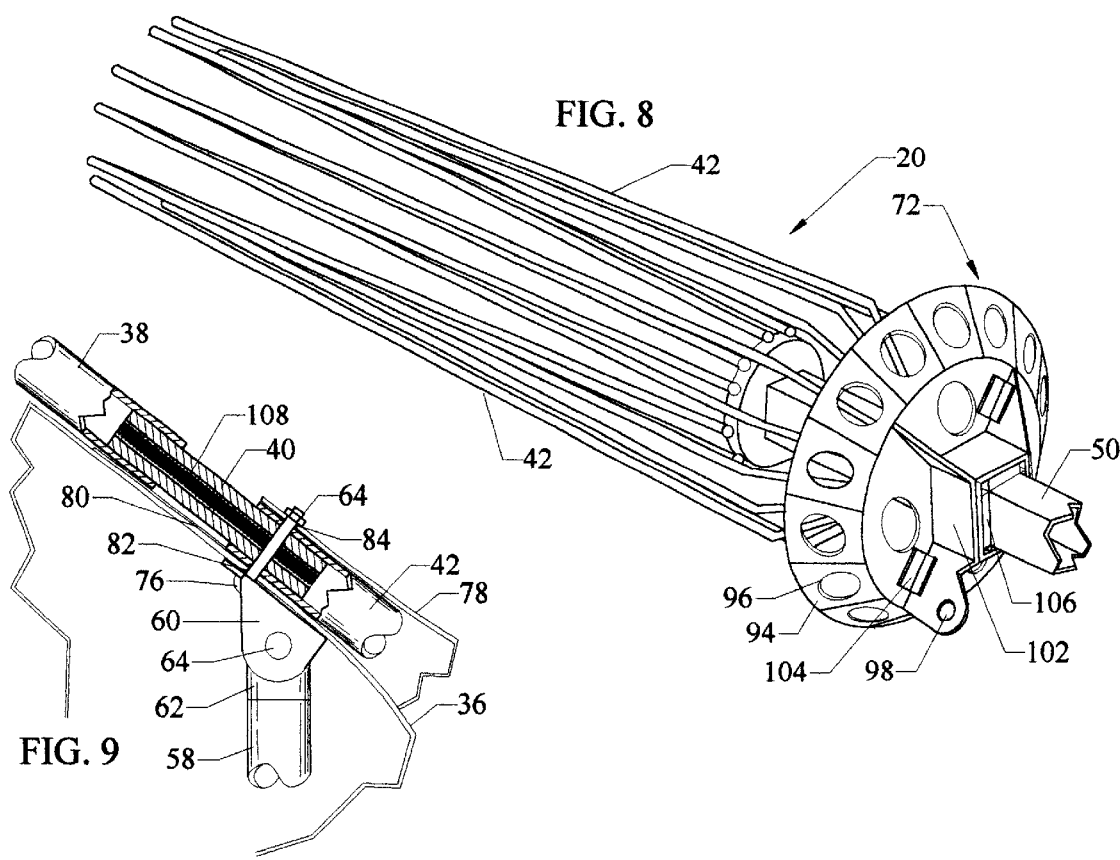
FIG. 8
FIG. 9
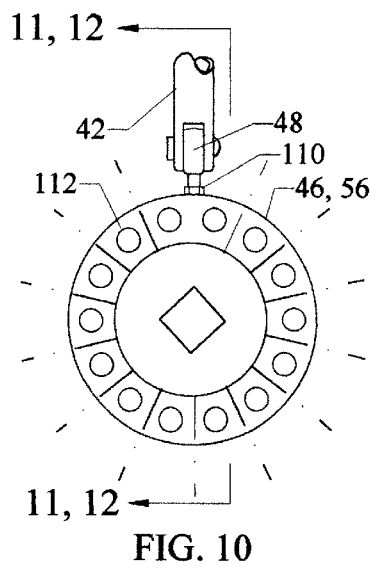
FIG. 10
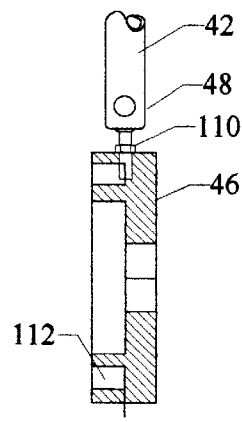
FIG. 11
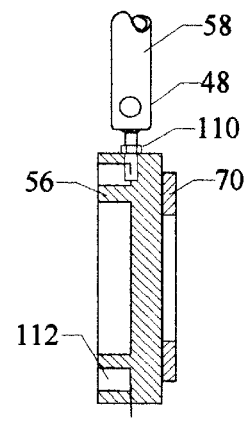
FIG. 12

COLLAPSIBLE AIRSHIP BATTEN ASSEMBLY

CROSS-REFERENCE TO RELATED APPLICATION

This application claims the priority of U.S. provisional application Serial No. 60/254,865, filed Dec. 11, 2000. As such, the specification of the above mentioned U.S. provisional application is incorporated herein by reference in full.

FEDERALLY SPONSORED RESEARCH

Not Applicable

SEQUENCE LISTING OF PROGRAM

Not Applicable

BACKGROUND

Field of the Invention

This invention relates generally to the field of transportation, and more particularly to a new and unique collapsible airship nose batten assembly which provides and maintains the aerodynamic shape during forward flight while retaining the sealed integrity of the containment chamber as it is being inflated, and is also able to fold during deflation and storage, while remaining an integral part of the airship assembly.

DESCRIPTION OF PRIOR ART

In the early 1900's, Count Ferdinand von Zeppelin created the first rigid airship, which had a metal framework to support the shape. Many of these first airships were used during World War I to bomb England. Because they offered a tremendous observation platform, early U.S. blimps were used to escort military ships through coastal waters. It was evident even at this early stage that the forward sections needed significant structural support to withstand the stresses incurred during forward flight. Primarily used as advertising aircraft, modern airship designs have evolved little from these early military aircraft, with few improvements in theory and technology. Some designs, particularly in terms of the reinforcing of the forward section of the airship hull, have remained virtually unchanged over the evolution of the aircraft.

The structure that comprises the battens for present day airships involves a rigid nose frame incorporating the mooring attachment and a number of pre-formed spars or battens radiating from the periphery and permanently attached to the skin of the hull. In practice, the nose batten assembly has been attached after the airship was inflated with a lifting gas, such as helium.

Since the cost of helium is extremely high, the convenience of deflating the airship for storage is prohibitive. Because of the rigid shape-conforming nature of the batten structure, the airship hull as well as the battens themselves would be damaged in this process. The inconvenience of deflation of a helium airship dictates the requirement of perpetual inflation and the need for storage on a mooring mast with subsequent twenty-four hour supervision, or storage in a large hanger. The concept of a deflatable airship has been a long sought-after solution to the exorbitant cost of operation for the present technology.

Experiments in attaching propulsive engines to hot air balloons has introduced a promising new approach to the cost-reduction solution for airship operations. Deriving their lift from heated air rather than expensive helium allows this new breed of airships to be inflated when needed and deflated and stored when not in use. These hot air airships, however, have lacked the ability to incorporate sufficient nose stiffening to achieve the equivalent airspeeds of helium airships. This would require a battening assembly that can unfold and erect in concert with the hull fabric during inflation, maintain a rigid shape while inflated and collapse in concert with the hull fabric during deflation.

With these requirements in mind, the inventor has designed an airship that utilizes heated air in place of helium and therefore can be inflated and deflated at will and, by virtue of a unique folding batten device, exhibits flight performance equivalent to that of a helium airship.

It has been found through the endeavors of the inventor and the patent search that there is no apparatus on the market and no apparent patents that have similar characteristics to the unique folding airship batten assembly devised by this inventor.

In a similar manner, Hagenlocher in U.S. Pat. No. 5,285,986 also teaches of a rigid framework that possesses the same limitations as Wagner. There is no mention of a nose stiffening structure or collapsible batten assembly in the art of this reference.

For example, U.S. Pat. No. 1,007,405 by Rudolf Wagner et al. describes a complete framework for a gas airship that is of great strength and which enables the operator to remain in flight as long as possible. The airship described within this patent was constructed with a structural metal framework, which would make it impractical in hot air airship applications.

Terrell H. Yon, Jr., in U.S. Pat. No. 4,762,295, teaches of a mooring structure that minimizes distortion of the hull during mooring, but does not describe a folding batten assembly that maintains the aerodynamic shape of the hull during forward flight.

John D. Hunt, in U.S. Pat. No. 5,429,325 also teaches a mooring nose cone assembly that was developed to improve upon the heavier and more costly hard nose structures with battens. This patent does not describe a structure that maintains the aerodynamic shape of the hull during forward flight.

U.S. Pat. Nos. 1,544,190 by J. C. Smith, and 1,656,137 by A. Bradford both include references to rigid nose caps that contribute to the aerodynamic shape of the hull during forward flight, but do not describe the ability to deploy and collapse during inflation and deflation.

U. S. Pat. No. 3,116,037 by P. E. Yost describes an inflated tube mounted internally in a balloon intended to stiffen the hull while being towed by another aircraft. This pressurized tube, however, did not incorporate rigid stiffeners that could be deployed and collapsed during inflation and deflation.

U.S. Pat. No. 1,505,135 by Ludwig Durr teaches of an invention that refers to airships and more especially, to airships of the rigid type, comprising a plurality of gas chambers and its particular object is a novel system for stiffening the outer envelopes of the gas chambers. This is another patent that relates to the structural elements of a rigid airship only.

No prior art teaches or suggests the particular novelty of the folding airship nose batten assembly.

OBJECTS AND ADVANTAGES

In addition to the objects and advantages of the folding nose batten assembly described in the above invention, several additional objects and advantages include:

(a) to provide a device that will support, protect, and maintain the aerodynamic profile of the nose of an airship.

(b) to provide a device that will support and protect the nose of an airship when it is being maneuvered by way of its ground handling lines.

(c) to provide a device that will support and protect the nose of an airship when it is attached to its mooring station.

(d) to provide a device that will disperse the stresses involved, while restraining an airship, through a large area of the nose section.

(e) to provide a device that will support and protect the nose of an airship while in forward flight.

(f) to provide a collapsible batten assembly for the nose of an airship.

(g) to provide a foldable, lightweight batten assembly for ease of handling and storage.

(h) to create a means by which the nose batten assembly can be made to collapse at will.

(i) to create a means of sealing the fabric containment chamber while supplying an airship nose batten assembly.

(j) to create an airship that can collapse into a small space and be easily transported, not requiring a hanger.

(k) to create a lightweight nose batten assembly that will be an integral part of the airship.

Other objects and advantages of the present invention will become apparent from the following descriptions, taken in connection with the accompanying drawings, wherein, by way of illustration and example, an embodiment of the present invention is disclosed. The drawings constitute a part of this specification and include exemplary embodiments to the invention, which may be embodied in various forms. It is to be understood that in some instances various aspects of the invention may be shown exaggerated or enlarged to facilitate an understanding of the invention.

SUMMARY

In accordance with a preferred embodiment of the invention, a collapsible airship batten device comprises an inflatable containment chamber and a batten assembly, which is attached to the front section of the containment chamber. The batten assembly is opened upon inflation of the containment chamber and the batten assembly is freely collapsible during the deflation process.

DRAWINGS

DRAWING FIGURES

FIG. 1 is a side view of the airship incorporating the unique folding batten assembly.

FIG. 2 is a view through the batten and airship fabric skin showing a typical batten sleeve.

FIG. 3 is a cross section through the folding nose batten assembly and the nose of the airship, with areas broken out to display internal parts.

FIG. 4 is a view through the nose spar showing the spoke and spoke hinge bracket.

FIG. 8 is a perspective view of a folded nose batten assembly.

FIG. 9 is a side view of the flexible batten joint between the nose spar and batten, broken away to show the urethane flexible batten joint and encapsulated flex shaft.

FIG. 10 is an end view of the nose spar hinge hub.

FIG. 11 is a cross section of the nose spar hinge hub.

FIG. 12 is a cross section of the spoke hinge hub.

REFERENCE NUMERALS IN DRAWING

Figure 5:
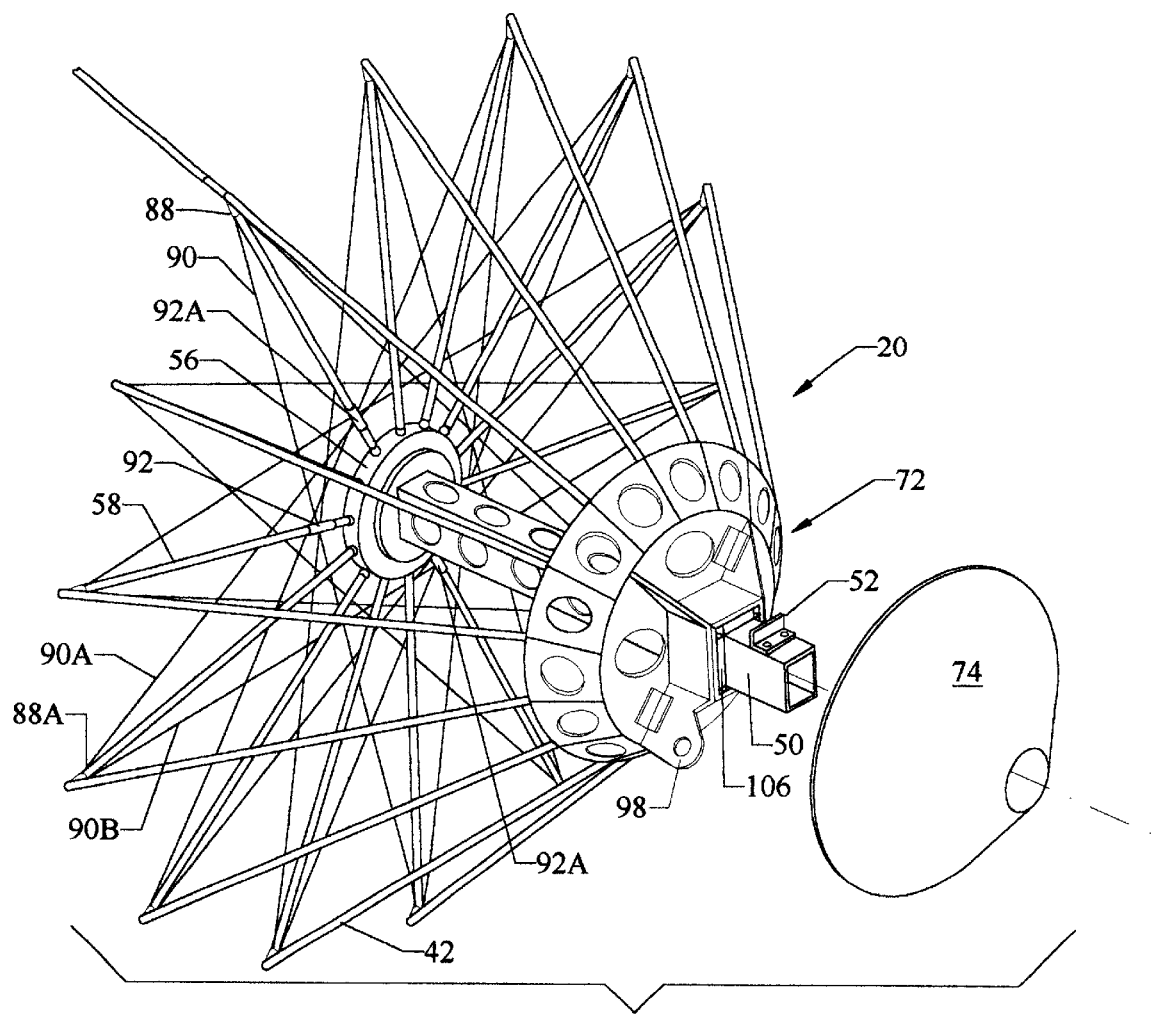
FIG. 5 is a perspective view of a deployed nose batten assembly displaying the alignment line network configuration and nose cone.

20 Folding nose batten assembly
22 Airship
24 Car
26 Engine
28 Propeller
30 Vertical stabilizer/rudder
32 Horizontal stabilizer/elevator
34 Batten sleeve
36 Envelope skin
38 Batten
40 Flexible batten joint
42 Nose spar
44 Fold allowance bend
46 Nose spar hinge hub
48 Rod end adjustable swivel
50 Central deployment guide beam
52 Deployment guide stop
54 Lightening holes
56 Spoke hinge hub
58 Spoke
60 Spoke hinge bracket
62 Spoke end
64 Hinge pin
66 Orifice in envelope nose
68 Flexible sleeve
70 Seal
72 Nose plate assembly
74 Nose cone
76 Hinge pin bracket bolt
78 Nose cone cover
80 Finger patch reinforcement
82 Orifice in envelope skin
84 Orifice in nose cone cover
86 Nut
88 Spoke end line mounts (88A typical application)
90 Alignment lines (90A and 90B typical application)
92 Line attachment mounts (92A and 92B typical application)
94 Nose plate/spar stops
96 Lightening holes
98 Ground handling line attach gusset
100 Bearing gusset
102 Bearing housing
104 Angle mounts
106 Bearings
108 Flex shaft
110 Locking nut
112 Lightening hole

DETAILED DESCRIPTION

DESCRIPTION OF THE PREFERRED EMBODIMENTS

Detailed descriptions of the preferred embodiments are provided herein. It is to be understood, however, that the present invention may be embodied in various forms.

Therefore, specific details disclosed herein are not to be interpreted as limiting, but rather as a basis for the claims and as a representative basis for teaching one skilled in the art to employ the present invention in virtually any appropriately detailed system, structure or manner.

Referring now to the drawing FIG. 1 that illustrates the folding nose batten assembly 20 installed on an airship 22, with the car 24, the engine 26, and propeller 28, mounted below the airship hull. The vertical stabilizer/rudder 30 and the horizontal stabilizer/elevator 32 control the steering while heated air or a lifting gas, such as helium, supplies the lift.

FIG. 2 is a view through the batten 38 and the sleeve 34 in the envelope skin 36. The batten assembly is attached to the airship 22 in part by the means of sleeves 34 attached to the exterior of the envelope skin 36 where a plurality of battens 38 are housed. The battens 38 are preferably made of graphite due to its high strength and lightweight characteristics, although other materials known in the art may be used.

In accordance with the important details of the present invention, FIG. 3 shows the cross section view through the folding nose batten assembly and the nose of the airship. Each batten 38 is connected to the adjoining nose spar 42 by the means of a flexible batten joint 40. The nose spars 42 translate inwardly with a fold allowance bend 44 to align each nose spar 42 with the nose spar hinge hub 46, connected by means of a rod end adjustable swivel 48, to slide up and down the central deployment guide beam 50 to facilitate the folding action of the device. The central deployment guide beam 50 is preferably a square tube, a plurality of lightening holes 54 along the flat surface with the spoke hinge hub 56 rigidly affixed to the rear. A plurality of spokes 58 translates outwardly from the spoke hinge hub 56 to be connected to the nose spars 42 by means of a spoke hinge bracket 60. Each spoke end 62 pivots on a hinge pin 64 when the nose batten assembly 20 is in the collapsing mode. The spoke hinge hub 56 is attached to each spoke 58 by a rod end adjustable swivel 48, as used in the nose spar hinge hub 46.

Turning now to the drawing FIG. 4 which shows a view taken through the nose spar 42 showing the spoke end 62, the spoke hinge bracket 60, hinge pin 64 and the hinge pin bracket bolt 76. The means for attaching the spoke hinge bracket 60 to the nose spar 42 also supplies the means to attach and seal the envelope skin 36 and the incorporated finger patch reinforcement 80 to the nose batten assembly 20. Additionally, the nose cone cover 78 uses the same attachment point. The hinge pin bracket bolt 76, attached to the hinge bracket 60, passes through the orifice in the envelope skin 82, then through the nose spar 42 and through the orifice in the nose cone cover 84 and is held in place by nut 86.

At the forward section of the envelope skin 36 is located the orifice in the envelope nose. 66 around the central deployment guide beam 50 and translates aft through a flexible sleeve 68. The flexible sleeve 68 as drawn can be an integral part of the envelope skin 36, or may be a separate piece and made from a variety of flexible materials and attached to the envelope skin 36. The flexible sleeve 68 is furthermore attached to the spoke hinge hub 56, forming an effective seal 70. The nose plate assembly 72 is fixed to the nose spar hinge hub 46 to be further described in FIG. 6. A plastic or composite nose cone 74 covers the forward end to the nose batten assembly 20.

FIG. 5 presents a perspective view of the deployed folding nose batten assembly 20 showing the plurality of nose spars 42 emanating out from the nose plate assembly 72 without showing the envelope skin 36, or the nose cone cover 78. The nose cone 74 is projected away from the central deployment guide beam 50 to display the location of the attached deployment guide stop 52. All spoke end line mounts 88 similarly bed together by a network of alignment lines 90 which are comprised of a low stretch cordage or cable. Typically spoke end line mount 88A would be connected by sections of alignment line 90A and 90B to two different line attachment mounts 92A and 92B that are located near the midpoints on the spokes 58, both being approximately 90 degrees from the spoke end line mount 88A. This same paring will continue until all spoke end line mounts 88 have been interconnected with all line attachments 92 with the respective alignment lines 90.

Figure 6:
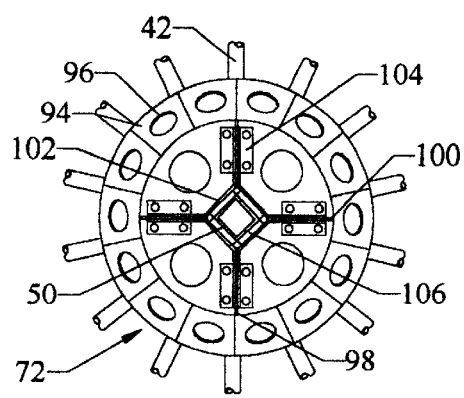
FIG. 6 is an end view of the deployment guide beam and nose plate assembly.
Figure 7:
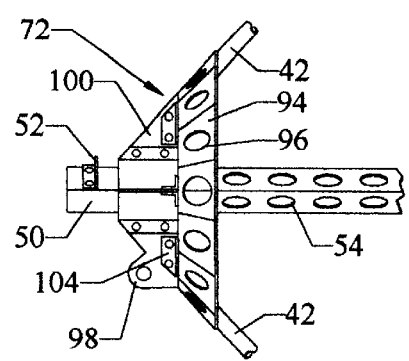
FIG. 7 is a side view of the deployment guide beam and nose plate assembly.

FIG. 6 illustrates a front view, and FIG. 7 illustrates a side view, of the nose plate assembly 72 with typical nose plate/spar stops 94, each having a lightening hole 96 and tapering back in the configuration of the airship 22. The nose plate assembly 72 has one or more ground handling line attachment gussets 98 and bearing gussets 100, with four bearing housings 102, all held together with a series of angle mounts 104. Within the bearing housings 102 are four bearings 106 forming a sliding means whereby the nose plate assembly 72 will slide along the central deployment guide beam 50. The ground handling line attachment gusset 98 is the point of attachment for the airship 22 to a ground tethering station or ground handling lines that are used by crew to maneuver the airship 22 while not in flight.

FIG. 8 is a perspective view of the folded nose batten assembly 20, without the envelope skin 36, the nose cone cover 78, or the nose cone 74.

Turning to FIG. 9, which presents a side view of the flexible batten joint 40 with the side removed to clarify the encased flex shaft 108 and the sealing means of the envelope skin 36.

FIG. 10 is an end view of the nose spar hinge hub 46 with a single nose spar 42 and rod end adjustable swivel 48 showing how a locking nut 110 retains the rod end adjustable swivel 48.

FIG. 11 shows a cross section view through the nose spar hinge hub 46 further clarifying the attachment means of the nose spar 42.

FIG. 12 shows the similar attachment of the spoke 58 to the spoke hinge hub 56.

ADVANTAGES

From the description above, a number of advantages of folding nose batten assembly become evident:

(a) The use of a folding nose batten assembly enables hot air airships to incorporate a means of stiffening the front section of the envelope and therefore achieve airspeeds equivalent to that of traditional helium airships while providing a means of repeated inflations and deflations without damage to either battens or envelope fabric.

(b) Providing an airship with a means of battening the envelope also provides a structural anchor point for ground line attachment, greatly expanding the range of weather conditions in which the airship can be ground handled.

(c) The use of folding nose battens on airships allows the aircraft to be collapsed and stored in a small space rather than a hanger or being moored, and to be transported via ground rather than being flown, thereby greatly increasing the utility and cost-effectiveness of operations.

(d) When used in the traditional helium airship design, the folding nose batten allows the airship to be inflated with the battens pre-attached, significantly shortening the inflation duration and reducing the effort of attaching singular battens to an already-inflated envelope.

(e) An additional advantage for the helium airship is evident in the rare case of a deflation where, with the use of folding nose battens, the battens need not be removed prior to the process and damage is avoided to either battens or envelope fabric.

Operations—FIGS. 3, 5 and 8

When not in use, the aircraft may be stored in a deflated state where the batten assembly 20 is folded in a small cylindrical package and all nose spars 42, spokes 58 and battens 38 lie in line as illustrated in FIG. 8.

As air or lifting gas is introduced to the envelope 22, the skin 36 inflates and expands, gradually pushing the nose spars 42 apart and pulling the spoke hinge hub 56 rearward along with the attached central deployment guide beam 50 as illustrated in FIG. 5. This figure also pictures the alignment lines 90 that limit the twisting and binding effects as the guide beam 50 slides in the bearing 106. The shape of an expanding airship envelope 22 can shift and change and the flexible batten joints 40 act as stress absorbers which allow the battens 38 to conform to these changes without breaking or transferring stress to the envelope skin 36.

When full inflation is achieved, the central guide 50 reaches its stop 52 and the spoke hinge hub 56 is at its most rearward travel as depicted in FIG. 5. In this configuration the spokes 58 are positioned in opposition to each other, thus putting each member into compression as flight stresses are experienced.

During ground handling or tethering, forces are transferred from the attached ground handling lines and gussets 98 to the nose plate assembly 72, the nose spar hinge hub 46, the nose spars 78 and then to the hinge pin bracket bolts 76. The envelope skin 36 is sandwiched between the nose spars 42 and the spoke hinge brackets 60 by the aforementioned hinge pin bracket bolts 76. Also sandwiched in this assembly are the finger patch reinforcements 80 which are attached to the envelope skin 36 over a large area, and it is this assembly that disperses these ground handling and/or tethering forces into the envelope skin 39.

During the deflation phase, the central deployment guide beam 50 is pulled forward along with the spoke hinge hub 56. The attached spokes 58 rotate out of opposition and retract the nose spars 42 along with them, eventually resulting with the nose batten assembly 20 in the fully collapsed depiction in FIG. 8.

Conclusions, Ramifications, and Scope

As can be seen, the collapsible airship batten assembly of this invention provides structural support to the airship while in forward flight as well as when attached to ground handling lines. In addition, this assembly makes it possible to frequently and regularly inflate and deflate an airship without damage or complicated disassembly. Specifically, the collapsible nose batten assembly has the advantages that:

1. supports, protects and maintains the aerodynamic profile of an airship as it encounters aerodynamic stresses;
2. supports and protects the nose of an airship when it is being maneuvered by way or its ground handling lines;
3. will disperse the stresses involved, while in forward flight as well as while being restrained, through a large area of the nose section;
4. supply a collapsible batten assembly for the nose of an airship;
5. supply a foldable, lightweight batten assembly for the nose of an airship;
6. creates a means by which the nose battens can be made to collapse at will;
7. create a means of sealing the fabric containment chamber while supplying an airship nose batten assembly;
8. creates an airship that can collapse into a small space and be easily transported, not requiring a hanger; and
9. creates a lightweight nose batten assembly that will be an integral part of the airship.
10. creates a lightweight nose batten assembly that will be an integral part of the airship.

While the present invention has been described herein, with references to particular embodiments thereof, a latitude of modification, various changes and substitutions are intended in the foregoing disclosure and will be appreciated that in some instances, some features of the invention will be employed without corresponding use of other features without departing from the scope of the invention as set forth.

Thus the scope of the invention should be determined by the appended claims and their legal equivalents, rather than by the examples given.

What is claimed is:

1. An airship batten assembly, comprising:
    (a) an inflatable containment chamber having first and second ends;
    (b) said batten assembly attached to said first end of said containment chamber;
    (c) aerodynamic shape-maintenance means for preventing said batten assembly and said first end of said containment chamber from deforming when in forward flight, and;
    whereby said batten assembly employs a deployment means upon inflation of said containment chamber, and;
    wherein said batten assembly employs a collapsing means upon deflation of said containment chamber;
    (d) a central beam having fore and aft ends;
    (e) a first attachment member rigidly affixed to said aft end;
    (f) a first set of longitudinal rods having first and second ends, said ends adjustably connected to and emanating out from said first attachment member;
    (g) a second attachment member slidably mounted on said central beam for movement along the length of said beam;
    (h) a second set of longitudinal rods each having first and second ends, said first end of said longitudinal rods attached to the exterior of said inflatable containment chamber and adjustably connected to said second end of said first set of longitudinal rods, said second ends of said longitudinal rods translating inwardly to movably connect with said second attachment member, and;
    whereby said movement of said second attachment member in a forward direction along said central beam facilitates the expansion of said first set of longitudinal rods and said second set of longitudinal rods and thus deployment of said batten assembly, and conversely;
    whereby said movement of said second attachment member in an aft direction along said central beam facilitates the contraction of said first set of longitudinal rods and said second set of longitudinal rods and thus folding of said batten assembly.

2. An airship, as claimed in claim 1 wherein said first and second containment chamber ends are fore and aft ends, respectively.

3. An airship, as claimed in claim 1 wherein said second end of first said set of longitudinal rods are hingibly connected to said first end of said second set of longitudinal rods.

4. An airship, as claimed in claim 1 wherein said first ends of said first set of longitudinal rods are pivotably connected to said first attachment member, and said second ends of said second set of longitudinal rods are pivotably connected to said second attachment member.

5. An airship, as claimed in claim 1 further comprising a set of extension rods attachably connected to said first ends of said second set of longitudinal rods and positioned adjacent said exterior of said containment chamber.

6. An airship, as claimed in claim 5 wherein said set of extension rods are attached to said second set of longitudinal rods by way of a flexible joint.

7. An airship, as claimed in claim 5 wherein said sets of extension rods are attached to said containment chamber.

8. An airship, as claimed in claim 1 wherein said second set of longitudinal rods are attached to said first set of longitudinal rods such that said containment chamber is sandwiched therebetween and thereby providing a means of forming an effective seal.

9. An airship as claimed in claim 8, further comprising a forward stop mounted near said fore end of said central beam.

10. A collapsible airship batten assembly in an airship comprising:

(a) an inflatable containment chamber;

(b) a central beam having fore and aft ends; a first attachment member ridgidly affixed to said aft end;

(c) a first set of longitudinal rods having first and second ends, said first ends adjustably connected to and emanating out from said first attachment member;

(d) a second attachment member slidably mounted on said central beam for movement along the length of said beam;

(e) a second set of longitudinal rods each having first and second ends, said first end of said second longitudinal rods attached to the exterior of said containment chamber and adjustably connected to said second end of said first longitudinal rods, said second ends of said second longitudinal rods translating inwardly to movably connect with said second attachment member, and;

whereby said slidable movement of said second attachment member in a forward direction along said central beam facilitates the expansion of said first set of longitudinal rods and said second set of longitudinal rods and thus deployment of said batten assembly, and conversely;

whereby said slidable movement of said second attachment member in an aft direction along said central beam facilitates the contraction of said first set of longitudinal rods and said second set of longitudinal rods and thus folding of said batten assembly.

11. A collapsible airship batten assembly in air airship comprising:

(a) an inflatable containment chamber;

(b) a central beam having fore and aft ends;

(c) an aft attachment member rigidly affixed to said aft end of said central beam;

(d) a stop means positioned at said forward end of said central beam;

(e) a forward attachment member mounted on said central beam for slidable movement between said aft attachment member and said stop means to facilitate the folding action of the batten assembly;

(f) a plurality of longitudinal spars aligned with and connected to said forward attachment member for movement therewith;

(g) a plurality of spreader rods adjustably connected between said plurality of longitudinal spars and said aft attachment member, and;

(h) an attachment means for mounting said batten assembly to the containment chamber of the airship, and;

whereby said movement of said forward attachment member in a forward direction along said central beam facilitates the expansion of said longitudinal spars and said spreader rods and thus deployment of said batten assembly, and conversely;

whereby said movement of said forward attachment member in an aft direction along said central beam facilitates the contraction of said longitudinal spars and said spreader rods and thus folding of said batten assembly.

* * * * *